(12) United States Patent
Kim

(10) Patent No.: US 8,325,294 B2
(45) Date of Patent: Dec. 4, 2012

(54) BACKLIGHT UNIT INCLUDING LAMP GUIDE

(75) Inventor: Jun-Sik Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/344,908

(22) Filed: Jan. 6, 2012

(65) Prior Publication Data
US 2012/0099294 A1 Apr. 26, 2012

Related U.S. Application Data

(62) Division of application No. 12/314,780, filed on Dec. 16, 2008, now Pat. No. 8,115,889.

(30) Foreign Application Priority Data

Feb. 28, 2008 (KR) .................. 10-2008-0018354

(51) Int. Cl.
*G02F 1/1335* (2006.01)
*G09F 13/04* (2006.01)

(52) U.S. Cl. ........................... 349/64; 362/97.1

(58) Field of Classification Search .............. 349/48–60, 349/68, 70; 362/97.1, 97.2, 382, 217.14, 362/225, 240, 396, 249
See application file for complete search history.

(56) References Cited

U.S. PATENT DOCUMENTS

| | | | |
|---|---|---|---|
| 6,783,256 B2 | 8/2004 | Moon | |
| 6,902,300 B2 | 6/2005 | Lee | |
| 7,070,313 B2 | 7/2006 | Kim et al. | |
| 7,434,958 B2 * | 10/2008 | Yang et al. | 362/225 |
| 7,461,958 B2 | 12/2008 | Takata et al. | |
| 7,465,062 B2 | 12/2008 | Kwon | |
| 7,540,649 B2 * | 6/2009 | Satoh et al. | 362/630 |
| 7,594,747 B2 | 9/2009 | Tsai et al. | |
| 7,777,830 B2 | 8/2010 | Lee et al. | |
| 7,817,224 B2 * | 10/2010 | Sudo | 349/70 |
| 7,826,005 B2 | 11/2010 | Lee et al. | |
| 7,901,099 B2 * | 3/2011 | Namiki et al. | 362/97.1 |
| 2007/0053171 A1 | 3/2007 | Park | |
| 2007/0070652 A1 | 3/2007 | Takata et al. | |
| 2009/0268126 A1 * | 10/2009 | Son et al. | 349/62 |
| 2010/0142186 A1 * | 6/2010 | Aoki | 362/97.2 |

FOREIGN PATENT DOCUMENTS

JP 3992726 8/2007

* cited by examiner

*Primary Examiner* — Akm Enayet Ullah
(74) *Attorney, Agent, or Firm* — McKenna Long & Aldridge LLP

(57) ABSTRACT

A lamp guide includes: a horizontal part; at least one supporting part extending from a front surface of the horizontal part; a plurality of holding parts on the front surface of the horizontal part, each of the plurality of holding parts holding a lamp and twisted from the horizontal part; and at least one coupling part extending from a rear surface of the horizontal part.

8 Claims, 9 Drawing Sheets

BACKLIGHT UNIT INCLUDING LAMP GUIDE

This application is a divisional application of U.S. application Ser. No. 12/314,780, filed Dec. 16, 2008, now U.S. Pat. No. 8,115,889 which claims the benefit of Korean Patent Application No. 10-2008-0018354, filed on Feb. 28, 2008, each of which are hereby incorporated by reference as if fully set forth herein.

BACKGROUND OF THE INVENTION

1. Field of the Invention

The present invention relates to a backlight unit for a liquid crystal display (LCD) device, and more particularly, to a lamp guide, a backlight unit including the lamp guide and a liquid crystal display device including the backlight unit.

2. Discussion of the Related Art

Although cathode-ray tubes (CRTs) have been widely used as a display device for a television, a measuring instrument or an information terminal, it is hard to apply the CRTs to reduced electronic products in size and weight because of their heavy weight and large volume. Recently, flat panel display (FPD) such as liquid crystal display (LCD) devices, plasma display panels (PDPs), electroluminescent display devices (ELDs) and field emission display (FED) devices have been the subject of research and development because of their superior thin profile and light weight as compared with the CRTs.

Among various display devices, LCD devices have been widely used for a notebook computer, a monitor and a television because of their superiority in display quality of moving images and contrast ratio. The LCD device includes a liquid crystal panel having opposite two substrates and a liquid crystal layer between the two substrates. Since the LCD device is a non-emissive display device that displays images using an external light, the LCD device further includes a backlight unit under the liquid crystal panel as an additional light source.

The backlight unit is classified into an edge type and a direct type according to a position relation between the liquid crystal panel and a lamp of the backlight unit. The edge type backlight unit includes a light guide plate and at least one lamp disposed at one side or both sides of the light guide plate. The direct type backlight unit includes a plurality of lamps disposed under a plurality of optic sheets. In addition, the direct type backlight unit does not require a light guide plate (LGP) reflecting and refracting the light and has no limit according to a display size of the liquid crystal panel. Accordingly, the direct type backlight unit has been widely used for an LCD device having a size over about 20 inches.

FIG. 1 is a cross-sectional view showing a liquid crystal display device including a direct type backlight unit according to the related art. In FIG. 1, a liquid crystal panel 10 and a backlight unit 20 are integrated in an LCD device by mechanical elements. Accordingly, the LCD device includes the liquid crystal panel 10, the backlight unit 20, a bottom frame 50, a main frame 30 and a top frame 40. The liquid crystal panel 10 is disposed over the backlight unit 20, and the main frame 30 surrounds side surfaces of the liquid crystal panel 10 and the backlight unit 20. The top frame 40 surrounds a front edge surface of the liquid crystal panel 10, and the bottom frame 50 wraps a rear surface of the backlight unit 20. The top frame 40 and the bottom frame 50 are combined with the main frame 30.

The liquid crystal panel 10 includes a first substrate 12, a second substrate 14 and a liquid crystal layer (not shown) between the first and second substrates 12 and 14. Although not shown in FIG. 1, a driving circuit is connected to a side of the liquid crystal panel 10 and is bent toward a rear of the liquid crystal panel 10.

The backlight unit 20 includes a reflecting sheet 22, a plurality of lamps 24, a diffusing plate 29 and a plurality of optic sheets 26. The reflecting sheet 22 is disposed over the bottom frame 50. The plurality of lamps 24 are arranged in parallel over the reflecting sheet 22, and the diffusing plate 29 covers the plurality of lamps 24. The plurality of optic sheets 26 are disposed over the diffusing plate 29. Although not shown in FIG. 1, the plurality of lamps 24 may be fixed and supported by a lamp guide. The lamp guide supports the diffusing plate 29 and the plurality of optic sheets 26 to keep a uniform gap distance between the diffusing plate 29 and the plurality of lamps 24. In addition, the lamp guide prevents sway and break of the plurality of lamps 24 by impact.

FIG. 2 is a cross-sectional view showing a direct type backlight unit of a liquid crystal display device according to the related art. In FIG. 2, a reflecting sheet 22 and a lamp guide 60 are sequentially disposed over a bottom frame 50. The lamp guide 60 is coupled with the bottom frame 50 through a plurality of through holes of the reflecting sheet 22 and the bottom frame 50. A plurality of lamps 24 are hold and fixed by the lamp guide 60. In addition, a diffusing plate 29 and a plurality of optic sheets 26 are disposed over the plurality of lamps 24.

The lamp guide 60 includes a horizontal part 62, a supporting part 68, a holding part 66 and a coupling part 64. Since the supporting part 68 having a cone shape upwardly extends from a front surface of the horizontal part 62 to support the diffusing plate 29 and the plurality of optic sheets 26, the gap distance between each lamp 24 and the diffusing plate 29 is kept uniform. The holding part 66 on the front surface of the horizontal part 62 holds and fixes each lamp 24. In addition, the holding part 66 has a ring shape having an open portion. The coupling part 64 downwardly extends from a rear surface of the horizontal part 62 and is inserted through the plurality of through holes of the reflecting sheet 22 and the bottom frame 50.

As a size of the LCD device is enlarged, a thin profile of the LCD device has been the subject of recent research and development. For example, the LCD device having a reduced first distance d1 between the diffusing plate 29 and each lamp 24 and a reduced second distance d2 between the reflecting sheet 22 and each lamp 24 has been suggested. However, the LCD device has disadvantages due to the reduced first and second distances d1 and d2. For example, the light from the backlight unit may have a shadow band of the lamp guide 60. When the light from each lamp 24 is diffused by the diffusing plate 29, a plurality of virtual images separated from each other is generated due to a total reflection at a front surface of the diffusing plate 29. Specifically, the holding part 66 of the lamp guide 60 wrapping and blocking a portion of an outer surface of each lamp 24 generates the corresponding virtual images. Since the horizontal part 62 of the lamp guide 60 is arranged along a vertical line, the virtual images corresponding to the blocked portions of the adjacent lamps 24 held by the holding parts 66 of the lamp guide 60 overlap each other and form a shadow band having a relatively low luminance due to a light loss. As a result, the shadow band causes a stain of a displayed image of the LCD device.

FIG. 3 is a view showing a luminance distribution image of a backlight unit according to the related art. In FIG. 3, since the virtual images corresponding to the adjacent lamps 24 (of FIG. 2) overlap each other, a shadow band is generated in the luminance distribution image of the backlight unit and a display quality of the LCD device including the backlight unit is reduced.

SUMMARY OF THE INVENTION

Accordingly, the present invention is directed to a lamp guide and a liquid crystal display device including the lamp guide that substantially obviate one or more of the problems due to limitations and disadvantages of the related art.

An advantage invention is to provide a backlight unit where a shadow band is removed.

Another advantage of the present invention is to provide a liquid crystal display device having an improved display quality with a thin profile.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lamp guide includes: a horizontal part; at least one supporting part extending from a front surface of the horizontal part; and a plurality of holding parts on the front surface of the horizontal part, each of the plurality of holding parts holding a lamp and twisted from the horizontal part.

In another aspect, a backlight unit includes: a plurality of lamps; a plurality of lamp guides, each including: a horizontal part; at least one supporting part extending from a front surface of the horizontal part; and a plurality of holding parts on the front surface of the horizontal part, each of the plurality of holding parts holding each of the plurality of lamps and twisted from the horizontal part; and a pair of side supporters fixing and supporting opposite end portions of each the plurality of lamps.

In another aspect, a liquid crystal display device includes: a bottom frame; a plurality of lamps over the bottom frame; a plurality of lamp guides, each including: a horizontal part; at least one supporting part extending from a front surface of the horizontal part; and a plurality of holding parts on the front surface of the horizontal part, each of the plurality of holding parts holding each of the plurality of lamps and twisted from the horizontal part; a pair of side supporters fixing and supporting opposite end portions of each the plurality of lamps; a liquid crystal panel over the plurality of lamps; a main frame surrounding side surfaces of the liquid crystal panel; and a top frame surrounding a front edge surface of the liquid crystal panel, wherein the top frame and the bottom frame are combined through the main frame to include the liquid crystal panel therein.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE ILLUSTRATED EMBODIMENTS

Reference will now be made in detail to embodiments which are illustrated in the accompanying drawings. Wherever possible, similar reference numbers will be used to refer to the same or similar parts.

Figure 1:
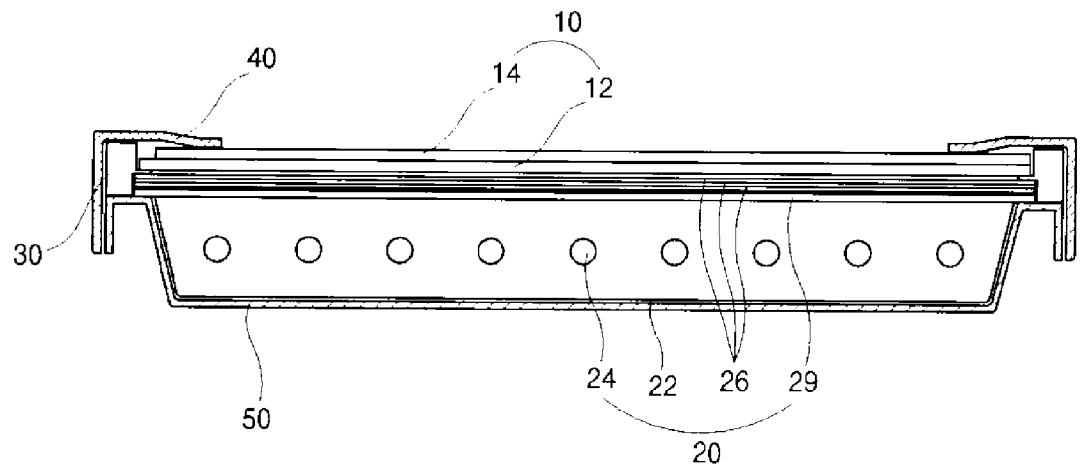
FIG. 1 is a cross-sectional view showing a liquid crystal display device including a direct type backlight unit according to the related art.
Figure 2:
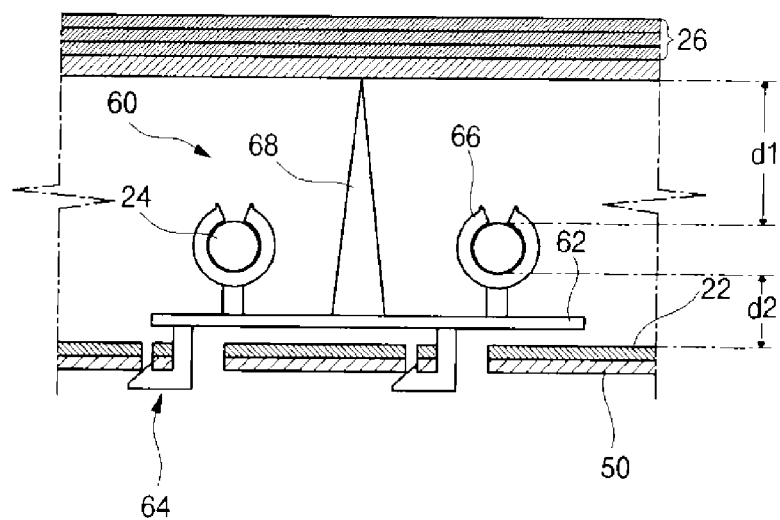
FIG. 2 is a cross-sectional view showing a direct type backlight unit of a liquid crystal display device according to the related art.
Figure 3:
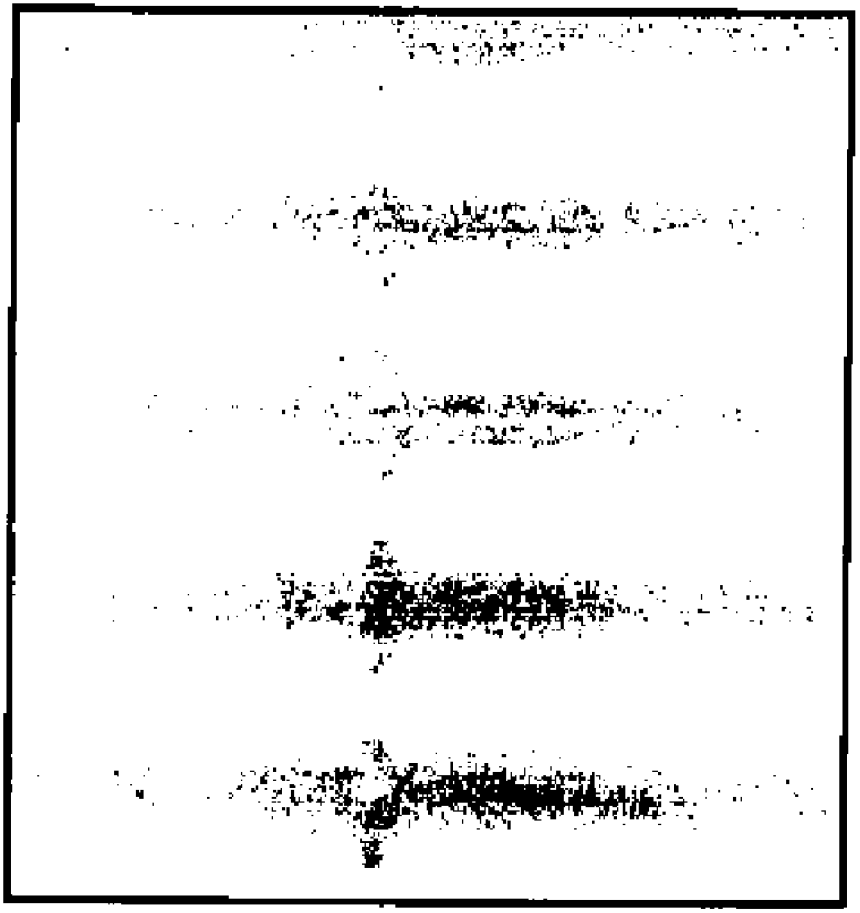
FIG. 3 is a view showing a luminance distribution image of a backlight unit according to the related art.
Figure 4:
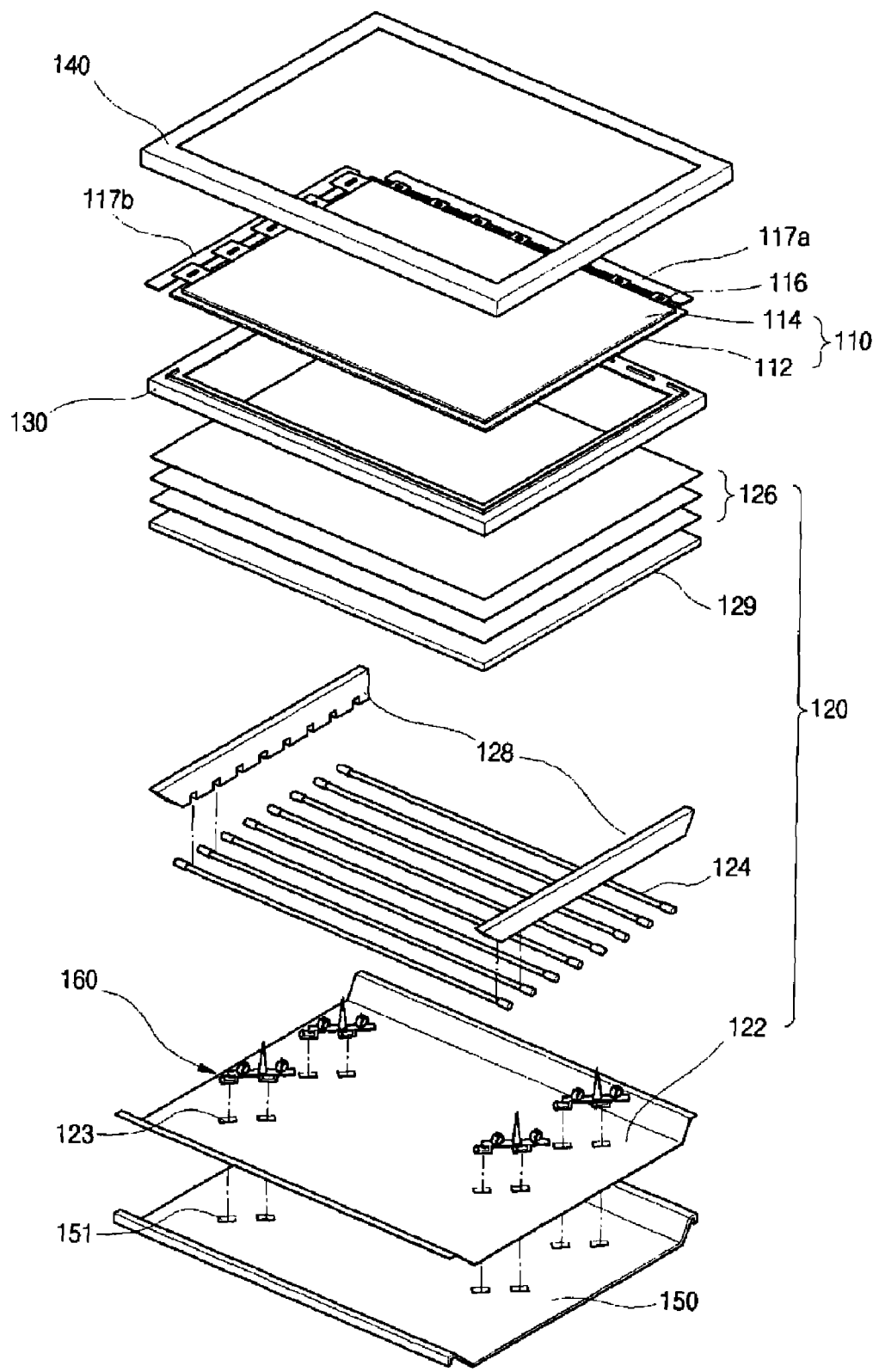
FIG. 4 is an exploded perspective view showing a liquid crystal display device according to an embodiment of the present invention.

FIG. 4 is an exploded perspective view showing a liquid crystal display device according to an embodiment of the present invention.

In FIG. 4, a liquid crystal display (LCD) device includes a bottom frame 150, a backlight unit 120, a liquid crystal panel 110, a main frame 130 and a top frame 140.

The liquid crystal panel 110 includes a first substrate 112, a second substrate 114 and a liquid crystal layer (not shown) between the first and second substrates 112 and 114. Although not shown in FIG. 4, a gate line and a data line are formed on an inner surface of the first substrate 112, which is referred to as a lower substrate or an array substrate. The gate line crosses the data line to define a pixel region, and a thin film transistor (TFT) is connected to the gate line and the data line. A pixel electrode connected to the TFT is formed in the pixel region. In addition, a black matrix and a color filter layer are formed on an inner surface of the second substrate 114, which is referred to as an upper substrate or a color filter substrate. The black matrix may correspond to the gate line, the data line and the TFT. The color filter layer includes red, green and blue color filters each corresponding to the pixel region. A common electrode is formed on the black matrix and the color filter layer.

A data driving unit 117a and a gate driving unit 117b are connected to adjacent two sides of the liquid crystal panel 110 through a tape carrier package (TCP) or a flexible printed circuit board (FPC). The data driving unit 117a applies an image signal to the data line in each frame, and the gate driving unit 117b sequentially applies an on/off signal for the TFT to the gate line. The data and gate driving units 117a and 117b are bent toward a side surface of the main frame 130 or a rear surface of the bottom frame 150. First and second polarizing plates may be formed on outer surfaces of the first and second substrates 112 and 114, respectively. When the TFT connected to the gate line is turned on by the on/off signal of the gate driving unit 117b, the image signal of the data driving unit 117a is supplied to the pixel electrode. The liquid crystal layer is rearranged by the electric field generated between the pixel electrode and the common electrode, and the transmittance of the liquid crystal layer is adjusted to display an image.

The backlight unit 120 is disposed under the liquid crystal panel 110 to supply a light to the liquid crystal panel 110. The backlight unit 120 includes a reflecting sheet 122, a plurality of lamps 124, a plurality of lamp guides 160, a pair of side supporters 128, a diffusing plate 129 and a plurality of optic sheets 126. The reflecting sheet 122 is disposed over the bottom frame 150, and reflects the light from the plurality of lamps 124 toward the liquid crystal panel 110. For example, the reflecting sheet 122 may include aluminum (Al). The plurality of lamps 124 are parallel to and spaced apart from each other over the reflecting sheet 122. For example, the plurality of lamps may include one of a cold cathode fluorescent lamp (CCFL), a hot cathode fluorescent lamp (HCFL) and an external electrode fluorescent lamp (EEFL). In addition, the pair of side supporters 128 fix and support opposite end portions of each of the plurality of lamps 124, and the plurality of lamp guides 160 fix and hold intermediate portions of each of the plurality of lamps 124. Each of the plurality of lamp guides 160 is coupled with the bottom frame 150 and the reflecting sheet 122 through a plurality of first through holes 151 in the bottom frame 150 and a plurality of second through holes 123 in the reflecting sheet 122. Further, each of the plurality of lamp guides 160 is disposed to make an angle of about 10° to about 80°, preferably about 40° to about 50°, with each of the plurality of lamps 124.

The diffusing plate 129 is disposed over the plurality of lamps 124, and the plurality of optic sheets 126 are disposed over the diffusing plate 129. The diffusing plate 129 diffuses the light to improve the uniformity of luminance. For example, the diffusing plate 129 may include a lenticular pattern or a prism pattern on an upper surface or a lower surface thereof. Alternatively, the diffusing plate 129 may include a double-layered structure of first and second layers, which have different refractive indexes to generate a refraction effect at an interface. The plurality of optic sheets 126 may include a diffusing sheet, a prism sheet and a protecting sheet to improve an efficiency of the light from the plurality of lamps 124. As a result, the light emitted from the plurality of lamps 124 and reflected on the reflecting sheet 122 is supplied to the liquid crystal panel 110 through the diffusing plate 129 and the plurality of optic sheets 126, and the luminance of the light becomes uniform when the light is passing through the diffusing plate 129 and the plurality of optic sheets 126.

The backlight unit 120 and the liquid crystal panel 110 are sequentially disposed over the bottom frame 150, and the main frame 130 surrounds side surfaces of the backlight unit 120 and the liquid crystal panel 110. The top frame 140 surrounds a front edge surface of the liquid crystal panel 110, and the bottom frame 150 wraps a rear surface of the backlight unit 120. The bottom frame 150 may have a rectangular shape and two opposite sides of the bottom frame 150 may be bent. In addition, the top frame 140 may have a shape of "L" in cross-sectional view. The top frame 140 and the bottom frame 150 are combined through the main frame 130 to include the liquid crystal panel 110 and the backlight unit 120 therein.

Figure 5:
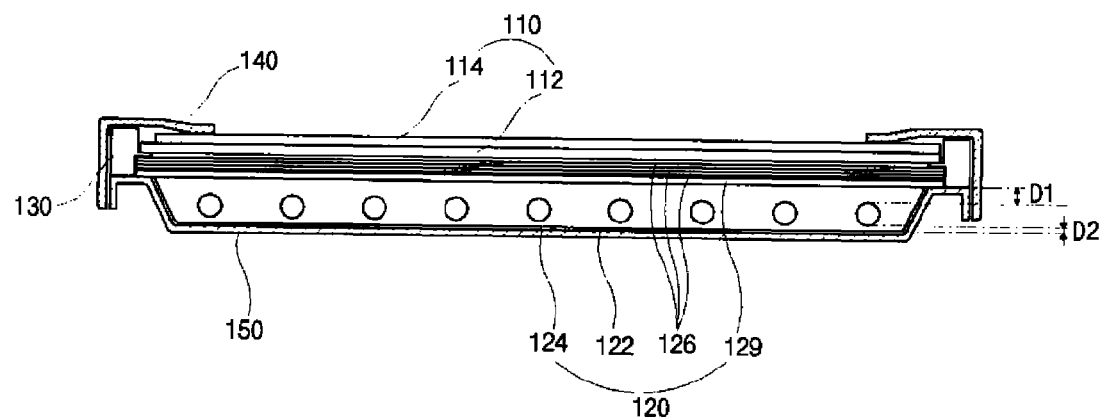
FIG. 5 is a cross-sectional view showing a liquid crystal display device according to an embodiment of the present invention.

FIG. 5 is a cross-sectional view showing a liquid crystal display device according to an embodiment of the present invention.

In FIG. 5, a liquid crystal display (LCD) device includes a liquid crystal panel 110, a backlight unit 120, a bottom frame 150, a main frame 130 and a top frame 140. As compared with the LCD device according to the related art, a first distance D1 between a diffusing plate 129 and each lamp 124 and a second distance D2 between a reflecting sheet 122 and each lamp 124 are reduced. Accordingly, the LCD device has a thinner profile. Although not shown in FIG. 5, the diffusing plate 129 may have a lenticular pattern or a prism pattern on an upper surface or a lower surface thereof, or may have a double-layered structure of first and second layers having different refractive indexes. As a result, the light from the plurality of lamps 24 are diffused by the diffusing plate 129 and the luminance uniformity of the backlight unit is improved, thereby deterioration such as a stain of a displayed image is prevented.

Moreover, since each of a plurality of lamp guides is disposed to make an angle of about 10° to about 80°, preferably about 40° to about 50°, with each of the plurality of lamps, virtual images corresponding to the adjacent lamps held by the single lamp guide do not overlap each other so that a shadow band can be prevented in the LCD device according to the present invention.

Figure 6A:
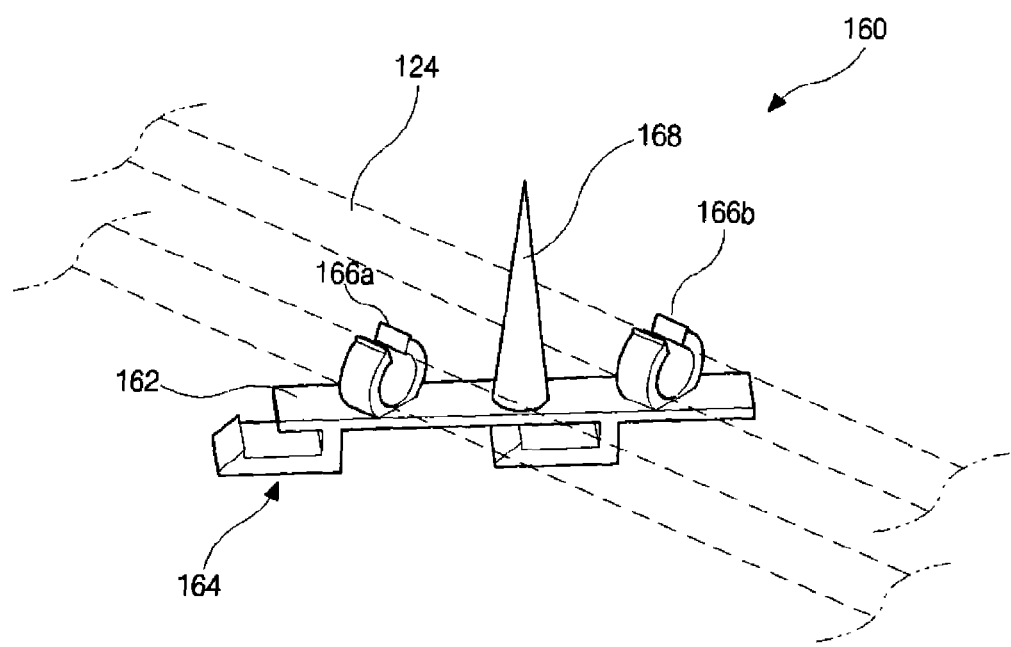
FIGS. 6A and 6B are a perspective view and a plan view, respectively, showing a backlight unit of a liquid crystal display device according to an embodiment of the present invention.
Figure 6B:
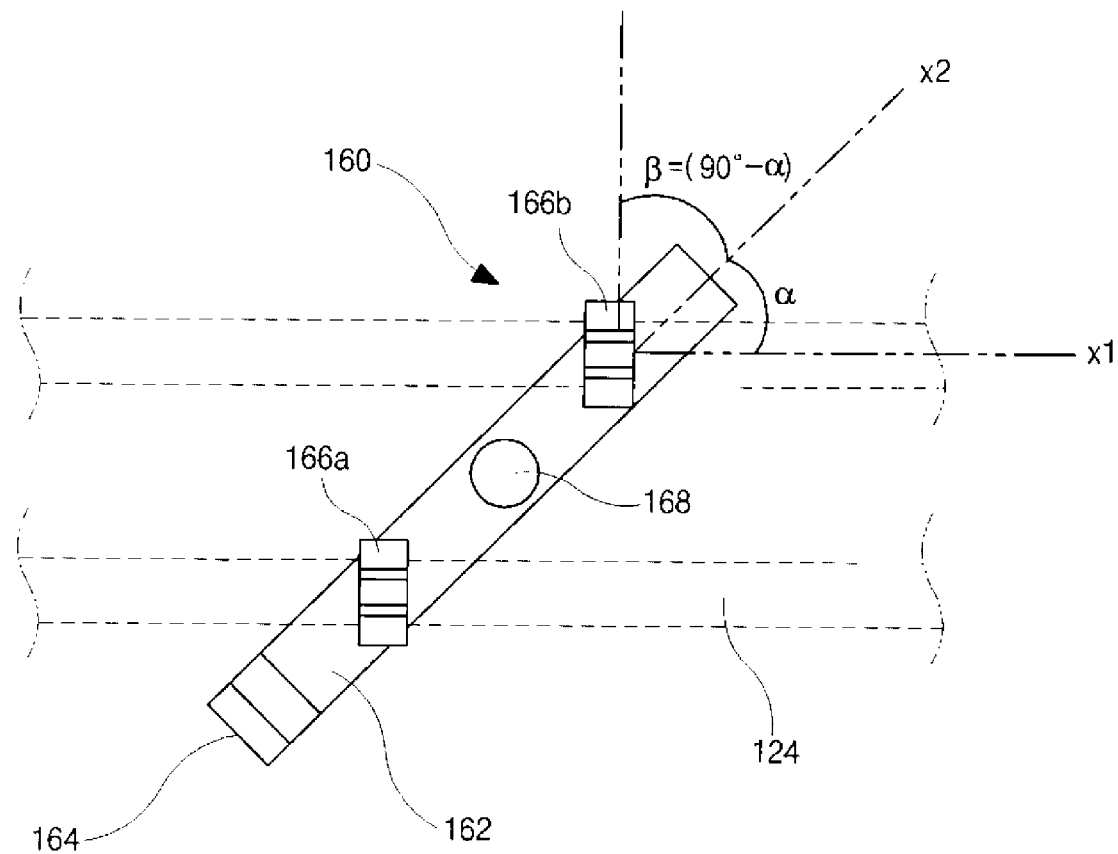

FIGS. 6A and 6B are a perspective view and a plan view, respectively, showing a backlight unit of a liquid crystal display device according to an embodiment of the present invention.

In FIG. 6A, a lamp guide 160 is disposed over a reflecting sheet 122 (of FIG. 5). The lamp guide 160 includes a horizontal part 162, a supporting part 168, first and second holding parts 166a and 166b and a coupling part 164. The horizontal part 162 has a rectangular plate shape and functions as a main body of the lamp guide 160. Since the supporting part 168 having a cone shape upwardly extends from a front surface of the horizontal part 162 to support the diffusing plate 129 (of FIG. 5) and the plurality of optic sheets 126 (of FIG. 5), the gap distance between each lamp 124 and the diffusing plate 129 is kept uniform and warpage of the diffusing plate 129 is prevented. The supporting part 168 may have a height from the front surface of the horizontal part 162 greater than each of the first and second holding parts 166a and 166b. In addition, the coupling part 164 downwardly extends from a rear surface of the horizontal part 162 and is inserted through the plurality of through holes of the reflecting sheet 122 and the bottom frame 150 (of FIG. 5), thereby fixing the lamp guide 160 to the bottom frame 150. For example, the lamp guide 160 may include at least two coupling parts 164 and each coupling part 164 may have a bent portion.

Further, the coupling part may be integrated with the reflecting sheet or the bottom frame of a plastic in another embodiment and the reflecting sheet may be omitted when the bottom frame may be formed of a reflective material. Accordingly, the lamp guide including the horizontal part, the supporting part and the holding part may be formed on the bottom frame including a protrusion corresponding to the coupling part without the reflecting sheet in another embodiment.

The bottom frame 150 includes a plurality of first through holes 151 (of FIG. 4) and the reflecting sheet 122 includes a plurality of second through holes 123 (of FIG. 4). The plurality of first through holes 151 and the plurality of second through holes 123 correspond to the coupling parts 164 of the plurality of lamp guides 160. Accordingly, the coupling part 164 is inserted into each of the plurality of second through holes 123 and the plurality of first through holes 151, thereby the lamp guide is fixed to the bottom frame 150.

Each of the first and second holding parts 166a and 166b on the front surface of the horizontal part 162 holds and fixes each lamp 124. Each of the first and second holding parts 166a and 166b has a ring shape having an open portion. As shown in FIG. 6B, each lamp 124 is disposed along a first direction x1 and the horizontal part 162 of the lamp guide 160 is disposed along a second direction x2 making a first angle α with the first direction x1. Accordingly, the first and second holding parts 166a and 166b are twisted from the horizontal part 162 by a second angle β (=90°−α). For example, the first angle α is within a range of about 10° to about 80°, preferably about 40° to about 50°. Since a longer axis of the lamp 124 is disposed along the first direction x1 and a longer axis of the horizontal part 162 is disposed along the second direction x2, a normal line of a front surface of the first and second holding parts 166a and 166b is parallel to the first direction x1 and makes the first angle α with the second direction x2. As a result, the plurality of lamp guides 160 is disposed such that the longer axis of the horizontal part 162 makes the first angle α with the first direction x1.

Figure 7:
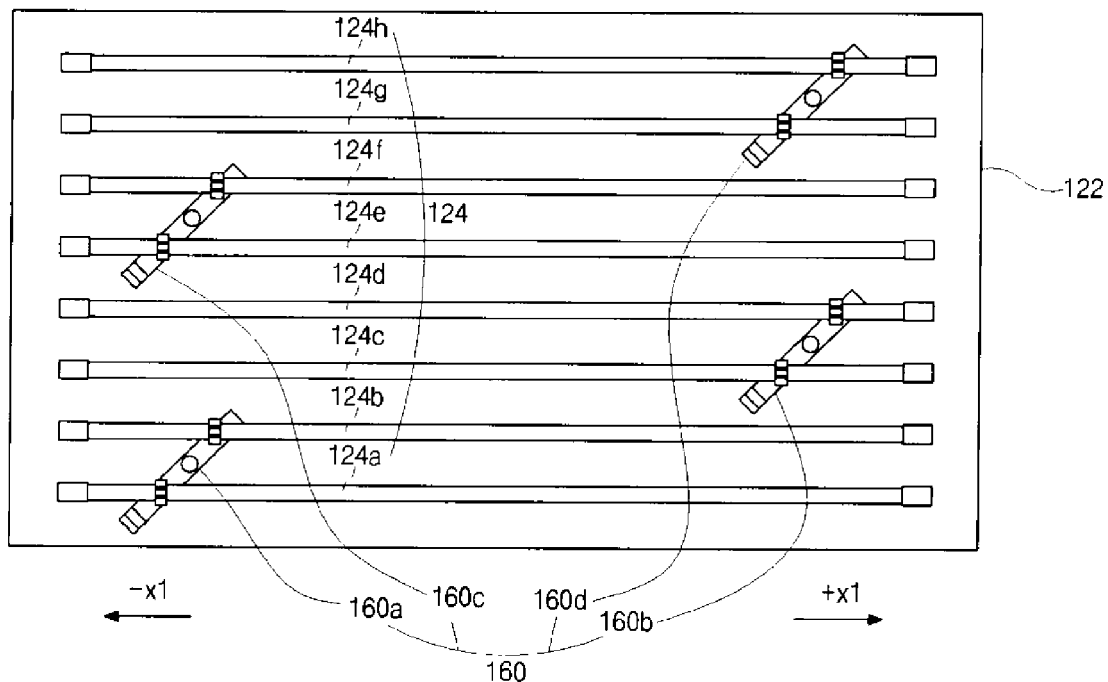
FIG. 7 is a plan view showing a backlight unit of a liquid crystal display device according to an embodiment of the present invention.

FIG. 7 is a plan view showing a backlight unit of a liquid crystal display device according to an embodiment of the present invention.

In FIG. 7, a plurality of lamps 124 are disposed over a reflecting sheet 122. The plurality of lamps 124 are parallel to and spaced apart from each other. A plurality of lamp guides 160 hold and fix the plurality of lamps 124. For example, the single lamp guide 160 may hold and fix at least two adjacent lamps 124. In addition, the plurality of lamp guides 160 may be alternately disposed at one side portion of each lamp 124. For example, the eight lamps 124 may be fixed by the four lamp guides 160. The first lamp guide 160a may hold left side portions of the first and second lamps 124a and 124b, and the third lamp guide 160c may hold left side portions of the fifth and sixth lamps 124e and 124f. In addition, the second lamp guide 160b may hold right side portions of the third and fourth lamps 124c and 124d, and the fourth lamp guide 160d may hold right side portions of the seventh and eighth lamps 124g and 124h.

Since each of the plurality of lamp guides 160 is disposed such that the longer axis of the horizontal portion 162 (of FIG. 6B) makes the first angle α of about 10° to about 80°, preferably about 40° to about 50°, with the longer axis of each lamp 124, the first and second holding parts 166a and 166b (of FIG. 6B) of the single lamp guide 160 are not disposed along a vertical line and the virtual images corresponding to the adjacent lamps 124 held by the first and second holding parts 166a and 166b do not overlap each other. For example, the virtual image corresponding to the first holding part 166a of the first lamp guide 160a holding the first lamp 124a does not overlap the virtual image corresponding to the second holding part 166b of the first lamp guide 160a holding the second lamp 124b.

Further, since the plurality of lamp guides 160 are alternately disposed at one side portion of each lamp 124, the adjacent lamp guides 160 are not disposed along a vertical line and the virtual images corresponding to the adjacent lamps 124 held by the adjacent lamp guides 160 do not overlap each other. For example, the virtual image corresponding to the second holding part 166b of the first lamp guide 160a holding the second lamp 124b does not overlap the virtual image corresponding to the first holding part 166a of the second lamp guide 160b holding the third lamp 124c. As a result, a shadow band having a relatively low luminance is prevented in the backlight unit.

Moreover, since the gap distance between the diffusing plate 129 (of FIG. 5) and each lamp 124 is kept uniform by the plurality of lamp guides 160, diffusion efficiency is improved. Furthermore, since the plurality of lamps 124 are fixed by the plurality of lamp guides 160, sway and break of the plurality of lamps 124 are prevented. In addition, since the diffusing plate 129 and the plurality of optic sheets 126 (of FIG. 5) are supported by the plurality of lamp guides 160, warpage of the diffusing plate 129 and the plurality of optic sheets 126 is prevented.

In another embodiment, the plurality of lamp guides 160 may be disposed such that two of the plurality of lamp guides 160 do not form a vertical line.

Figure 8:
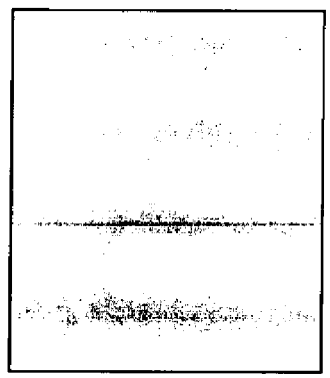
FIG. 8 is a view showing a luminance distribution image of a backlight unit of a liquid crystal display device according to an embodiment of the present invention.

FIG. 8 is a view showing a luminance distribution image of a backlight unit of a liquid crystal display device according to an embodiment of the present invention.

In FIG. 8, since the horizontal part of each lamp guide is twisted to make the first angle of about 10° to about 80°, preferably about 40° to about 50°, with each lamp and the plurality of lamp guides are alternately disposed, a shadow band due to overlap of the virtual images corresponding to the holding portions of the adjacent lamps is prevented. The number of the plurality of lamp guides may be determined according to the number of the plurality of lamps. In addition, the first and second holding parts of each lamp guide may have various shapes. For example, each of the first and second holding parts may have a "Y" shape or a "U" shape. Further, the number of the plurality of lamp guides may be changed according to the number of the holding parts that the single lamp guide includes. Moreover, the number and the shape of the coupling parts may be changed in another embodiment.

Figure 9:
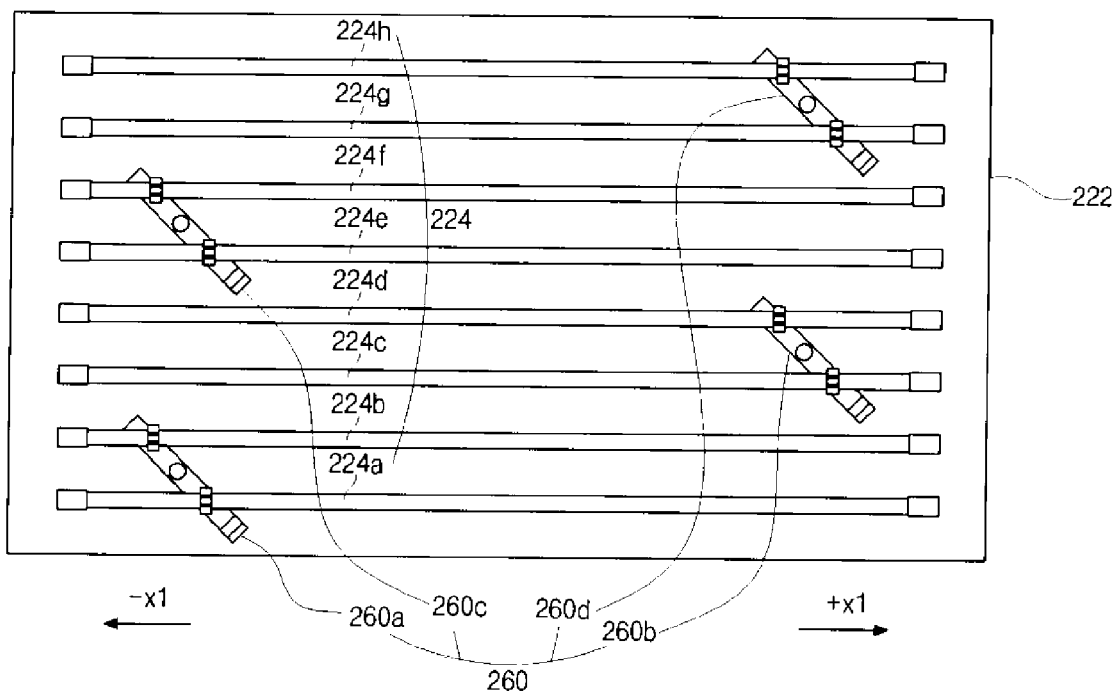
FIGS. 9 to 11 are plan views showing a backlight unit of a liquid crystal display device according to another embodiment of the present invention.
Figure 10:
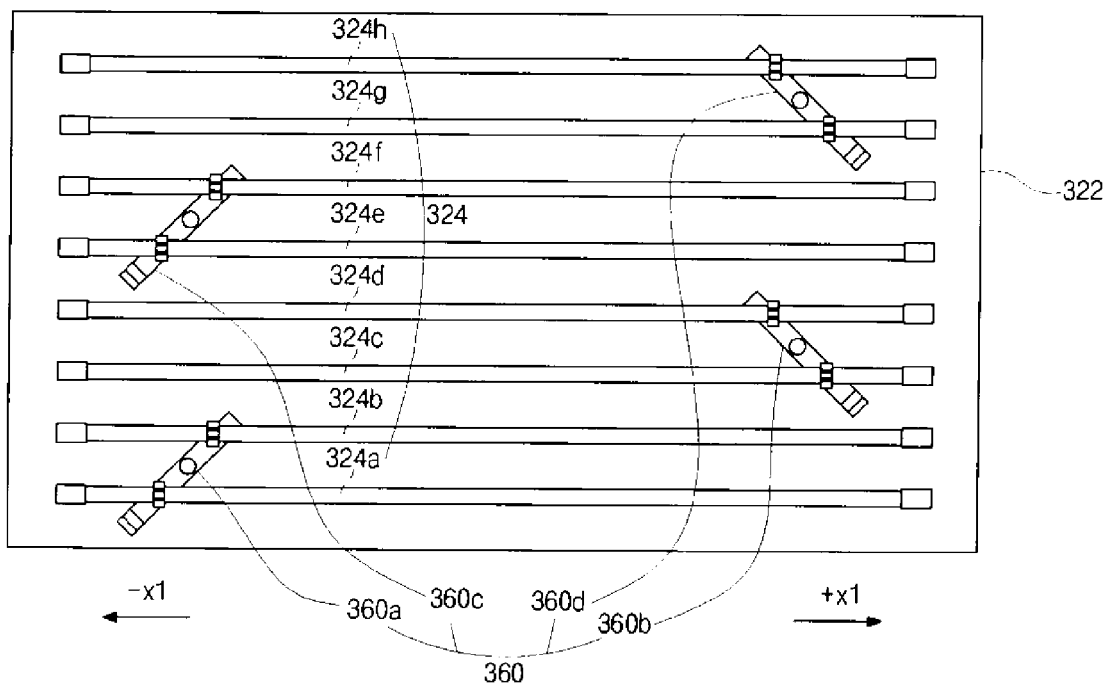
Figure 11:
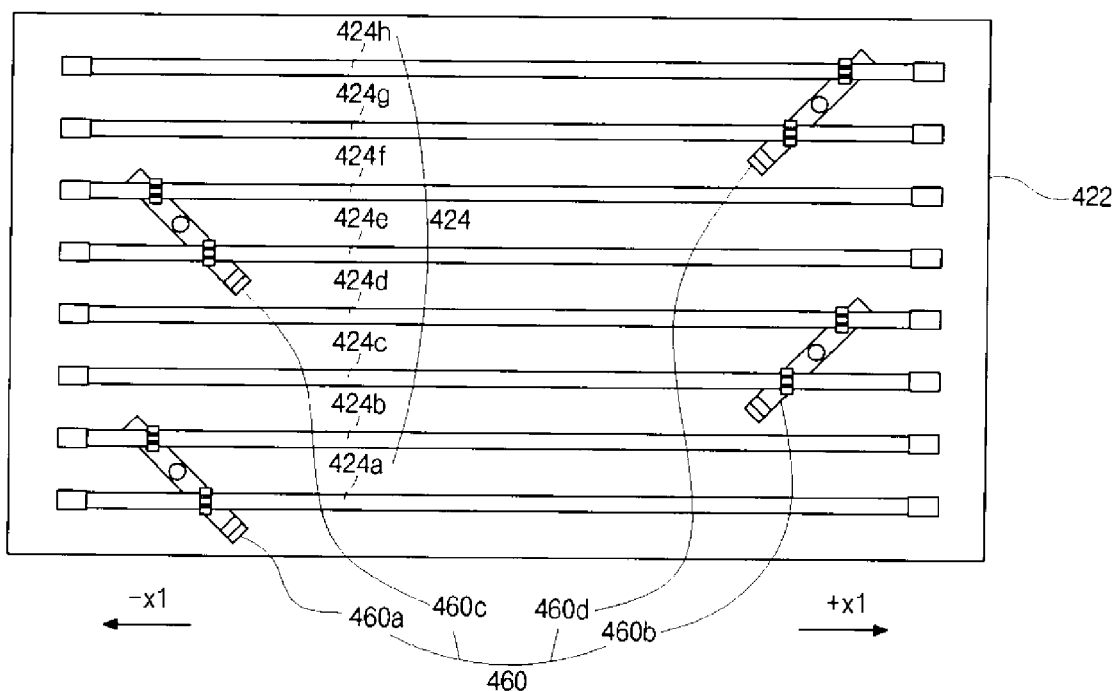

Although a longer axis of each horizontal part of the first to fourth lamp guides 160a to 160d makes the first angle α with a positive portion of the first direction x1 in FIG. 7, the longer axis of the horizontal parts of the first to fourth lamp guides 160a to 160d may make the first angle α with one of positive and negative portions of the first direction x1 in another embodiment. FIGS. 9 to 11 are plan views showing a backlight unit of a liquid crystal display device according to another embodiment of the present invention.

In FIG. 9, a plurality of lamps 224 are disposed over a reflecting sheet 222, and a plurality of lamp guides 260 hold and fix the plurality of lamps 224. For example, the horizontal part of each of the first to fourth lamp guides 260a to 260d may make a first angle α with a negative first direction −x1.

In FIG. 10, a plurality of lamps 324 are disposed over a reflecting sheet 322, and a plurality of lamp guides 360 hold and fix the plurality of lamps 324. For example, the horizontal part of each of the first and third lamp guides 360a and 360c may make a first angle α with a positive first direction +x1, and the horizontal part of each of the second and fourth lamp guides 360b and 360d may make the first angle α with a negative first direction −x1.

In FIG. 11, a plurality of lamps 424 are disposed over a reflecting sheet 422, and a plurality of lamp guides 460 hold and fix the plurality of lamps 424. For example, the horizontal part of each of the first and third lamp guides 460a and 460c may make a first angle α with a negative first direction −x1, and the horizontal part of each of the second and fourth lamp guides 460b and 460d may make the first angle α with a positive first direction +x1.

Consequently, in a liquid crystal display device according to the present invention, since the horizontal portion of the lamp guide is twisted to make the first angle with the lamp, the virtual images corresponding to the holding portions of the adjacent lamps do not overlap each other and the shadow band of the luminance distribution image is prevented. As a result, uniformity and luminance of the backlight unit are improved. Further, since the gap distance between the diffusing plate and the lamp is kept uniform by the lamp guide, a uniform plane light source is obtained. In addition, since the lamp is stably held and fixed by the lamp guide, sway and break of the lamp are prevented.

It will be apparent to those skilled in the art that various modifications and variations can be made in a backlight unit and a liquid crystal display device including the backlight unit of the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
   a plurality of lamps;
   a plurality of lamp guides, each comprising:
   a horizontal part;
   at least one supporting part extending from a front surface of the horizontal part; and
   a plurality of holding parts on the front surface of the horizontal part, each of the plurality of holding parts holding each of the plurality of lamps and twisted from the horizontal part, wherein each of the plurality of holding parts has a ring shape having an open portion, and end portions of the ring shape are disposed completely opposite to each other along a direction perpendicular to a longer axis of each of the plurality of lamp; and
   a pair of side supporters fixing and supporting opposite end portions of each of the plurality of lamps.

2. The backlight unit according to claim 1, further comprising at least one coupling part extending from a rear surface of the horizontal part.

3. The backlight unit according to claim 1, wherein a longer axis of the horizontal part makes an angle of about 10° to about 80° with one of positive and negative portions of a longer axis of each of the plurality of lamps.

4. The backlight unit according to claim 1, wherein the plurality of lamp guides are alternately disposed at one side portion of each of the plurality of lamps.

5. The backlight unit according to claim 4, wherein the plurality of lamp guides include first to fourth lamp guides and the plurality of lamps include first to eighth lamps each having opposite first and second side portions, and wherein the first lamp guide holds the first side portions of the first and second lamps, the second lamp guide holds the second side portions of the third and fourth lamps, the third lamp guide holds the first side portions of the fifth and sixth lamps, and the fourth lamp guide holds the second side portions of the seventh and eighth lamp.

6. The backlight unit according to claim 1, further comprising:
   a reflecting sheet under the plurality of lamps;
   a diffusing plate over the plurality of lamps; and
   a plurality of optic sheets over the diffusing plate.

7. The backlight unit according to claim 6, wherein the diffusing plate includes one of a lenticular pattern and a prism pattern on at least one of upper and lower surfaces thereof.

8. The backlight unit according to claim 6, wherein the diffusing plate includes a double-layered structure of first and second layers that have different refractive indexes.

* * * * *